Jan. 19, 1943.  E. T. BURTON  2,309,044
TESTING SYSTEM
Filed Oct. 26, 1939
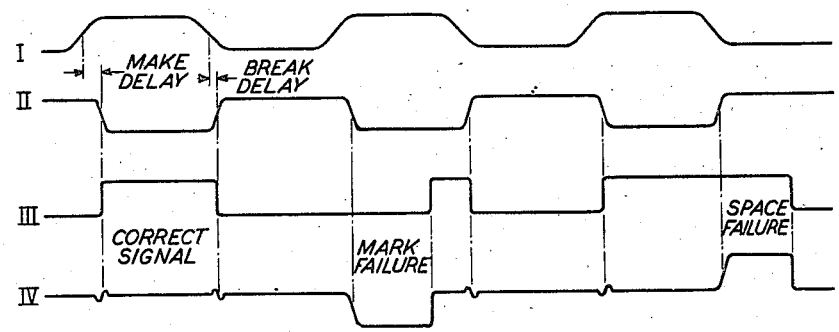
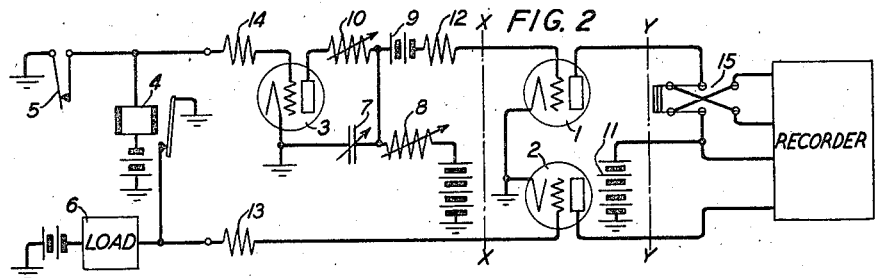
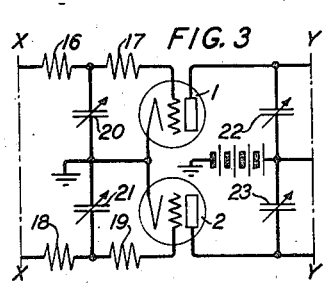
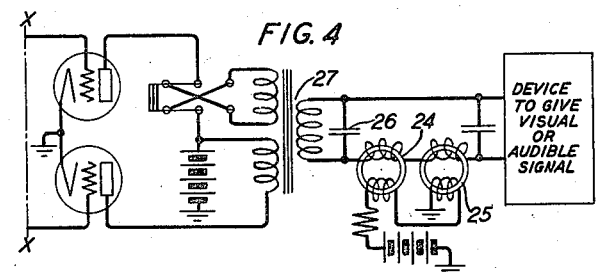
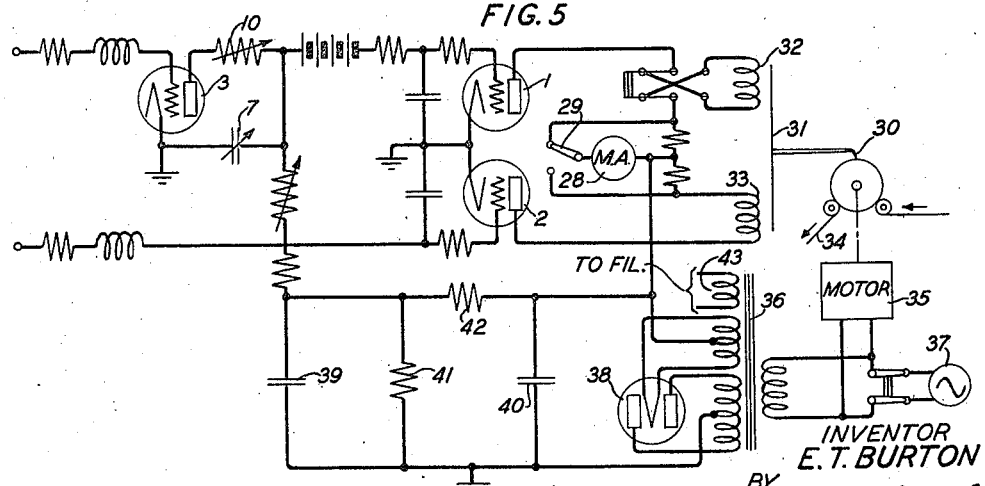
INVENTOR
E. T. BURTON
BY
John A. Hall
ATTORNEY Patented Jan. 19, 1943

2,309,044

UNITED STATES PATENT OFFICE

2,309,044

TESTING SYSTEM

Everett T. Burton, Millburn, N. J., assignor to Bell Telephone Laboratories, Incorporated, New York, N. Y., a corporation of New York Application October 26, 1939, Serial No. 301,395

8 Claims. (Cl. 177—311)

This invention relates to testing systems and particularly to means for testing the response of signal pulse repeating devices.

The object of the invention is to provide means for detecting and indicating abnormal responses of a signal pulse repeating device. The most common form of a signal pulse repeating device is an electromagnetic relay and so the description will be hereinafter written about such a relay by way of example. It will be understood, however, that the term "relay" may be taken to refer to any device designed for the reception of electrical signaling impulses and the transmission of other impulses corresponding in time thereto. For the stated object the relay under test is connected to a comparison circuit embodying the present invention which will not interfere with the operation of the relay or the signaling circuit in which such relay is operated but which will afford means for comparing the operation or release of the relay contacts with the energization or deenergization of its winding. In addition, means are provided to adjust the comparison circuit to compensate for expected delay in the operation of the relay after its energization and in the release of the relay after its deenergization. The indication of an abnormal operation or unstandard condition may take the form of an audible or a visual signal or of a permanent record which may be examined at some later time. In the case of a visual signal, the normal condition may give negative indication and the abnormal condition representing an unexpected operation or unstandard condition may give a positive indication, means, such as a lighted lamp, being used to indicate the latter and an unlighted lamp to indicate the former, or it might be reversed.

A feature of the invention is a vacuum tube circuit connected to the winding of a relay under observation and responsive to potential changes at the point of connection, and a similar vacuum tube circuit connected to the contacts of the relay and responsive to potential changes thereat. The output circuits of these vacuum tube arrangements are so combined that, when the relay is steadily energized with its contacts operated, the indication will be the same as when the relay is steadily deenergized with its contacts not operated. Since there is always some lag at the time of the impulse transitions in the operation of the contacts of a relay after the relay is energized and a similar, though different, lag in the release of the contacts of a relay after the relay is deenergized, electrical means are provided in accordance with the invention to adjustably compensate for the temporary difference in input to these two vacuum tube circuits at the time of an impulse transition so that the result of combining the two outputs thereof will be substantially continuously constant. Any substantial deviation from constancy therefore indicates an abnormal manner of operation of the relay.

Another feature of the invention is a means for observing the action of a relay independently of the manner or the regularity with which it is operated. With circuits responsive to changes in the condition of the winding and of the contacts connected to such points, comparison of the conditions of such points is made without reference to time or any other outside condition.

The drawing consists of a single sheet containing five figures.

Fig. 1 is a timing chart useful in explaining the operation of the invention;

Fig. 2 is a circuit diagram illustrating one form of the invention;

Fig. 3 is a circuit diagram showing an alternative portion of the circuit of Fig. 2;

Fig. 4 is a circuit diagram showing another alternative portion of the circuit of Fig. 2; and Fig. 5 is a circuit diagram showing another alternative of the circuit of Fig. 2.

The general principles, common to all these circuits, may be explained as follows: two triode vacuum tubes are arranged so that one grid receives signal voltages from the winding of the relay under observation while the other receives the contact voltages. For correct signals from the relay the adjustments of the tube circuits are such that, except at the short transition periods during which the signal current or voltage is rising or falling, the resulting plate currents are either zero of of a steady finite value. These two plate signals are combined in an output circuit so that the pulses of the two signal trains are either alternating and aiding or coincident and opposing. The combining arrangement to be used in a given case depends upon the relationship of polarities of the two inputs. In either case the resultant output to an indicating or recording instrument is essentially invariable.

The steady output condition is not attained unless the signal transition periods at both make and break of the relay contacts are essentially coincidental at the grids of the two triodes. Therefore, since some time delay is involved in the passage of a signal from the winding to the contacts of the relay, an appropriate delay must be introduced in the relay winding signal as applied to the triode grid relative to the relay contact signal. The delay at a signal make may not be of the same magnitude as that at the break. Therefore, the delay circuit must be arranged to permit separate adjustment of the two delays involved.

A simple monitoring circuit of this type is shown in Fig. 2. Tubes 1 and 2 are triodes constituting a mixer stage, the plate circuits of which repeat either complementary or opposed signals under normal conditions, as explained above. The plate circuits of these triodes work into a recording or indicating instrument where the balancing of the effect is accomplished. Tube 3 in the delay circuit receives its grid signal from the winding of the relay under test.

As shown, a relay 4 may be operated by a contact 5 of some kind and this relay will, in turn, close a circuit through a load 6. When the grid of tube 3 is carried negative by the opening of contact 5, no plate current flows and condenser 7 charges through the resistance 8. At the beginning of this process, the grid of triode 1 is negative and its plate current is zero. At some time during the charging of condenser 7, the condenser voltage passes through a magnitude which approximates that of battery 9. At this time the grid of triode 1 approaches zero potential and plate current is established in the tube 1. The delay between the application of a negative voltage to the grid of tube 3 and the establishment of plate current in the triode 1 is controlled by the values of the condenser 7 and the resistance 8. The delay is increased by increase of either of these units.

When the grid of tube 3 acquires zero potential upon closure of contact 5, the condenser 7 is discharged through tube 3 and resistance 10. During the discharge period, the grid of triode 1 becomes negative and the plate current of this tube becomes zero. The delay between the application of zero voltage to the grid of tube 3 and the cessation of plate current in tube 1 is controlled by the values of condenser 7 and resistance 10. To some extent resistance 8 affects this period since, while tube 3 is in the conducting state, some current flows from battery 11.

The tubes used in this circuit are preferably of reasonably high amplification. With such tubes a few volts negative to the grid suffices to reduce the plate current to zero. Use of a high resistance 14 in series with the grid circuit prevents the grid swinging more than very slightly positive on any input voltage and at the same time provides protection against interference with the normal operation of relay 4 if this is in an operating circuit while being tested. A tube in this condition becomes essentially equivalent to a relay when the grid swing considerably exceeds the active range of the grid, even though the applied voltage is not a square wave, that is, a signal whose transition period is substantially zero. As a result, the plate currents of the tubes 1 and 2 are, except for a brief transition period, either zero or essentially a steady finite value. Tube 3 operates on a similar principle, although the value of current varies according to condenser and resistance values. Therefore, under normal operation the plate current of tube 2 follows essentially a square wave, corresponding to the relay contact operation. The current of tube 1 also follows essentially a square wave corresponding to the relay winding voltage, but its operation is retarded appropriately by the action of the delay circuit so that the plate current transition points, or those points where such current crosses a signal zero or signal median line, are caused to coincide with those of tube 2.

A graphical representation of the operation of this circuit is shown in Fig. 1. Trace I represents a signal voltage wave appearing at the winding of relay 4. Trace II shows the corresponding wave appearing at the grid of triode 1 after having passed through the phasing circuit of tube 3. Trace III is the relay contact signal which is applied to the grid of triode 2. The phasing illustrated is such that the transition points of trace II, under normal conditions, are essentially coincidental with those of trace III. The first signal pulse illustrated shows normal operation of relay 4, and the output, trace IV, shows no response except for very minor ripples at the transition points. The subsequent signal pulses show partial failures at the relay contact, the second illustrating a delayed closure of the contact and the third a delayed contact opening. Trace IV shows the corresponding output pulses, indicating failures. It is evident that, where the output is connected directly to a polar indicating or recording instrument, the output current flows at each failure, and the type of failure is indicated by the direction of the output current. A reversing switch 15 is provided so that, irrespective of the polarities applied to the two mixer tube grids by a given signal impulse, the two plate circuits connecting to the output device may be so poled that their normal combined effects on the output device result in a minimum of actuation.

In certain cases almost perfect balance of the two signal waves can be secured. However, in the usual case some random observable unbalance occurs, although the signals are repeated satisfactorily. This is due to chatter and other minor irregularities in response, which are to be expected. The circuit as shown in Fig. 2 may be highly responsive to small unbalances, and when a low grade relay 4 is under test, slight unbalances are indicated almost continuously under normal operating conditions.

To reduce the sensitivity to small unbalances and to provide a means for adjustment of the sensitivity to the small and medium values of unbalance, several variations of this circuit may be used.

With shunt capacitances in either the grid or the plate circuits of the output triodes, considerable filtering may be achieved. These arrangements are shown in Fig. 3 which may be inserted in Fig. 2 at the broken lines XX and YY. The resistances 16, 17, 18 and 19 and the condensers 20, 21, 22 and 23 form well-known types of filtering means. Inductance may be used in the output circuit in conjunction with condensers to form low-pass filters.

Another variation is shown in Fig. 4 which may be substituted for the entire right-hand part of Fig. 2 beyond the broken line XX. This shows what may be termed amplitude discrimination, since use is made of a retardation coil whose high permeability core is easily saturated. A coil of a type formerly used as magnetic modulators and described in Patent 1,880,412, issued October 4, 1932, to E. T. Burton has been found satisfactory. Such a coil 24 is placed in series with the output and a condenser 26 is shunted across the circuit preceding the coil. This shunt condenser 26 reduces the peak voltages of the output pulses, the shorter pulses being reduced to a greater degree than the longer pulses. This permits the coil to present a high impedance to low amplitude pulses. However, on higher amplitude pulses, the core of the inductance becomes saturated to some degree and the higher the amplitude goes, the lower becomes the inductance. The result is that low amplitude pulses are highly suppressed while the higher amplitude pulses are only slightly affected. The current amplitude region at which the inductance changes rapidly may be varied by change of core size and the number of turns in the winding. Due to the presence of a fair degree of remanence in the permalloy cores, it is desirable to use a pair of cores 24 and 25 slightly biased in opposite directions by a small direct current through separate biasing windings. It is, of course, necessary to utilize an output coupling which prevents the direct component of the plate current from passing through the retardation coil windings and this is provided by the transformer 27.

The description of operation above has assumed that both input potentials vary between zero and some negative value. In cases where the variation does not normally cross the range of grid activity (such as a zero to a positive value) a modification is required to permit the input voltage variation to carry the grid through the range of activity. This result may be accomplished by inserting a C battery in the input lead concerned, a value being chosen which will cause the grid to be suitably actuated.

In preparing for a test in which this circuit is to be used, it is necessary to adjust the variables of the circuit until a minimum of resultant output current variation obtains under normal signal conditions. A sufficient degree of filtering should be used to satisfactorily attenuate the normal unbalances, but not enough to seriously affect the unbalance pulses due to failures. The performance may be examined while intentional failures are caused to occur.

In adjusting the monitoring circuit to a condition of balance, it is desirable to monitor the two plate currents of the output stage. For this purpose a plate current meter 28 is used and a switch 29 is provided to permit placing the meter in either plate circuit. In some cases it has been found desirable to connect a telephone headset across the output to permit aural observations while adjustments are being made.

Since, however, only occasional failures may be expected, it is desirable to connect the output to a tape recorder. This is indicated in Fig. 5 as a stylus 30 connected to a balanced armature 31 operated by the output coils 32 and 33. The stylus 30 may contact a paraffine-coated paper tape 34 moved steadily forward by a motor 35.

In the system shown in Fig. 5 a multicoil transformer 36 is used to supply power to the circuit from a commercial source of alternating current 37 through the well-known use of a rectifier tube 38 and the filtering circuit including condensers 39 and 40 and resistances 41 and 42. The secondary winding 43 of transformer 36 supplies filament current to the tubes 1, 2 and 3.

What is claimed is:

1. In a signaling system, means for observing the operation of a signal pulse repeating device in producing variable output currents, comprising first means responsive to an incoming signal pulse, second means responsive to said signal pulse as repeated by said device, adjustable means regulating at least one of said first or second means for compensating in said output currents for standard time delays between said incoming and repeated signal pulses normally occurring at the beginning and ending of said signal pulse, and indicating means controlled by said first means and by said second means for indicating an unstandard delay of said signal pulse repeating device.

2. A testing system for observing the operation of a signal pulse repeating device of the type having a time delay between incoming and repeater signal pulses comprising first means responsive to an incoming signal pulse, second means responsive to a repeated pulse from said device, and indicating means controlled by said first and second means in accordance with operations of said device to give indications of time delays between said incoming and repeated signal pulses, said first and second means being adjusted to control said indicating device to give a predetermined indication during rest condition of said device both during signal and no-signal conditions, said testing system further comprising compensating means adjustable to compensate for normal time delays between corresponding transition times of said incoming and repeated signal pulses for modifying the control of said indicating device to give the same said predetermined indication for said normal time delays and to give distinctly different indications for abnormal time delays between said corresponding transition times.

3. In a testing system, a signal pulse repeating device whose operation is to be observed, a first vacuum tube circuit responsive to a signal pulse transmitted to said device, a second vacuum tube circuit responsive to a signal pulse repeated by said device, a comparison circuit including the output terminals of said vacuum tube circuits and delay means in one of said vacuum tube circuits for compensating for expected delay in the operation of said device, said comparison circuit including means for indicating an unexpected delay in the operation of said device.

4. In a testing system, a relay to be tested, a vacuum tube circuit connected to the winding of said relay, a vacuum tube circuit connected to the contacts of said relay, a comparison circuit including the output terminals of said vacuum tube circuits and electrical delay means in one of said vacuum tube circuits for compensating for expected delay in response of said relay, said comparison circuit including means for indicating an unexpected delay in the response of said relay.

5. In a signaling system, means for observing the operation of a signal pulse repeating device comprising first means responsive to instantaneous variations in an incoming signal pulse, second means responsive to instantaneous variations in said signal pulse as repeated by said device, indicating means controlled by said first and second means in accordance with operations of said device to give corresponding instantaneous indications of non-concurring variations in said incoming and repeated signal pulses, and compensating means adjustable to compensate in the control of said indicating device for certain time delays between corresponding instantaneous variations in said incoming and repeated signal pulses to cause said indicating means to distinctly indicate other time delays between corresponding instantaneous variations of said incoming and repeated signal pulses.

6. In a signaling system, for operation of a signal pulse repeating device having a receiving winding and repeating contacts, first circuit means connected to be responsive to signal conditions in the winding side of said device to produce corresponding output currents, second circuit means connected to be responsive to signal conditions in the contact side of said device to produce corresponding output currents, a comparison circuit including indicating means connected to be responsive to the resultant instantaneous effects of said output currents to give indications of abnormal operations of said device, first compensating means connected to one of said circuit means for phasing the output current relative to the output current from the other of said circuit means to compensate for the normal delay between the impulse transition in said winding and the consequent closing of said contacts to prevent said indicating means from giving indication of said normal delay, and second compensating means connected to one of said circuit means for phasing the output current relative to the output current from the other of said circuit means to compensate for the normal delay between an impulse transition in said winding side and the consequent opening of said contacts to prevent said indicating means from giving an indication of said normal delay.

7. In a signaling system, means for observing and indicating an unstandard operation of a signal pulse repeating device, comprising a first means responsive to a signal pulse applied to said repeating device, a second means responsive to a repeated signal pulse from said device, a comparison circuit for producing indications responsive to said first and second means constructed and arranged to produce one type of indication when said first and second means remain normal, a like type of indication when said first and second means remain operated by signal pulses, and a different type of indication when said first and second means fail to operate coincidentally, and means for varying the operating time of one of said signal responsive means for compensating for normal time delays in said repeating device occurring at the beginnings and endings of said repeated signal pulse whereby the response of said comparison circuit to rest condition and to normal operation of said signal pulse repeating device will produce an unvarying indication of said first-named type.

8. In a signaling system, a pulse repeating device, a testing arrangement for said pulse repeating device comprising, a first means responsive to pulses incoming to said repeating device, a second means responsive to pulses outgoing from said repeating device, adjustable means retarding the response of the first means, whereby the response of the first means may be made to occur simultaneously with the response of the second means, and signaling means interposed to indicate any variation from the adjusted simultaneous occurrence of the responses.

EVERETT T. BURTON.